United States Patent [19]
Garih

[11] 3,802,043
[45] Apr. 9, 1974

[54] MILLING CUTTER WITH MECHANICALLY CLAMPED TEETH

[76] Inventor: Claude Garih, 35 Boulevard Exelmans, Paris 16, France

[22] Filed: Oct. 30, 1972

[21] Appl. No.: 301,816

[52] U.S. Cl. ............................................ 29/105 A
[51] Int. Cl. ........................................... B26d 1/12
[58] Field of Search ................... 29/96, 105, 105 A

[56] References Cited
UNITED STATES PATENTS

| | | |
|---|---|---|
| 3,229,350 | 1/1966 | Yogus ............................. 29/105 A |
| 3,434,190 | 3/1969 | Kaiser ............................. 29/105 A |
| 3,339,257 | 9/1967 | Hargreaves et al. ............... 29/105 A |
| 3,205,559 | 9/1965 | Greenleaf ........................ 29/105 A |

Primary Examiner—Harrison L. Hinson
Attorney, Agent, or Firm—Young & Thompson

[57] ABSTRACT

A high accuracy is obtained through adjustment of the cutting blades in the recesses housing them inside the cutter body, said adjustment being performed through a cam operated from the outside and acting on the blade which is held fast by a shim inside its recess, so as to deform it elastically and make it project to the desired extent beyond the cutter body. A support may be provided for the blade inside the recess.

4 Claims, 4 Drawing Figures

MILLING CUTTER WITH MECHANICALLY CLAMPED TEETH

Up to a quite recent time, the cutting teeth on a milling cutter were secured through hard-soldering to the body of the cutter. The teeth could be ground with an allowance within a few microns and ground again, when worn. When the teeth were completely worn out, they were discarded with the body of the cutter.

During the last few years, milling cutters have been produced, wherein the cutting teeth were removable and mechanically fitted in the cutter body, for instance with the interposition of shims and when the teeth were worn out, they were discarded and replaced by fresh teeth.

However, such cutters provided with discardable teeth have not proved hitherto to be competitive with cutters having hard-soldered teeth when they are to show a high accuracy with a view to producing a good surface condition, chiefly on a part made of a light metal or alloy.

As a matter of fact, it was necessary in the case of such mechanically fitted teeth to resort to teeth of a highly accurate outline and such extra-accurate teeth are very expensive.

Now the present invention has for its object a milling cutter provided with mechanically clamped teeth which although of a conventional type, are nevertheless highly accurate, their accuracy being comparable with that of cutters with hard-soldered teeth.

According to the invention, each of the teeth of my improved cutter or its support abuts against a cam adapted to pivot freely inside a recess formed for this purpose within the body of the cutter.

It is thus possible by turning the cam to a small extent, to make the corresponding tooth move slightly forwards, even if it is held fast inside the recess, so that it may assume the desired accurate position with an allowance within a few microns, as can be ascertained by means of a comparator. When the cam exerts a thrust on a tooth or on its support, said tooth or support which is held fast in its recess, is elastically compressed to a certain extent while, if the cam is caused to turn away from the tooth or support, the cutting edge of the tooth recedes. This arrangement provides an area of adjustment such as allows an accurate location to be obtained for the cutting edge of the tooth even if the adjusting procedure has caused said edge to pass beyond its desired accurate position.

There are described hereinafter by way of example and in a non-limiting sense, two embodiments of my improved cutter, reference being made to the accompanying drawings wherein.

Figure 1:
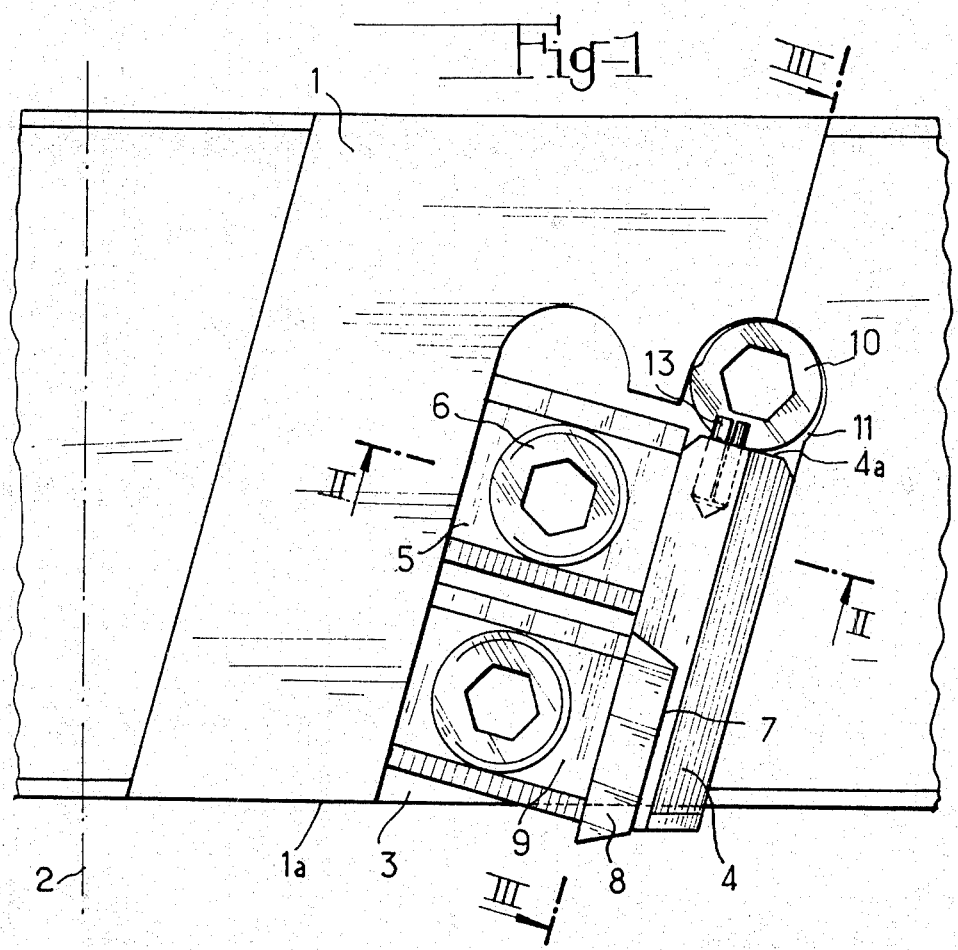
FIG. 1 is a view from above of a portion of the cutter according to the first embodiment.

As illustrated, my improved milling cutter includes a body 1 adapted to revolve around an axis 2 and provided with a plurality of recesses such as 3 opening into the operative outline 1a of the cutter body. In each of these recesses there is fitted a tooth 4 adapted to be wedged in position by a shim 5. The latter is held fast by a screw 6 the opposite ends of which are provided with threads of opposite pitche engaging corresponding tapping in the body 1 and the shim 5 respectively. The tooth 4 is cut out at 7 so as to house the cutting blade 8 bearing against the bosses 8a and 8b and held fast by a further shim 9 which is in its turn secured in position in a manner similar to the shim 5.

The inner transverse edge 4a of the body 4 abuts against a cam 10 fitted inside a cylindrical chamber 11 constituted by an extension of the recess 3, the rotation of said cam being controlled by a handle 12. This cam, the outline radius of which varies between values differing by 0.2mm. defines the longitudinal position of the tooth and consequently the amount by which the cutting blade 8 projects beyond the operative outline 1a of the cutter body. The inner edge 4a of the tooth carries a stud 13 projecting across the outer surface of the cam 10, so as to prevent the latter from dropping out of its chamber 11.

The different cutting blades of the cutter are first inserted in the corresponding teeth after the cooperating cam has been inserted in its chamber in the angular position for which the cutting blade projects by a minimum amount. The shims 5 and 9 are set tightly in position and the whole cutter is laid over a surface plate with a comparator; this being done, the differences in height between the tips of the cutting blades are measured and the comparator is set at zero for the cutting blade which projects to a maximum extent. After this operation, each of the other cutting blades is set under the comparator, the cam 10 being caused to turn for each blade until the pointer of the comparator has been returned to zero. This can be done without loosening the shims by reason of the high torque exerted and of the small amount, of a magnitude of say a few microns or a few 10 microns, by which the tooth is to move longitudinally.

The present invention is also applicable to milling cutters wherein the cutting blades are secured directly to the cutter body by mechanical means without any intermediate tooth or the like support.

Figure 2:
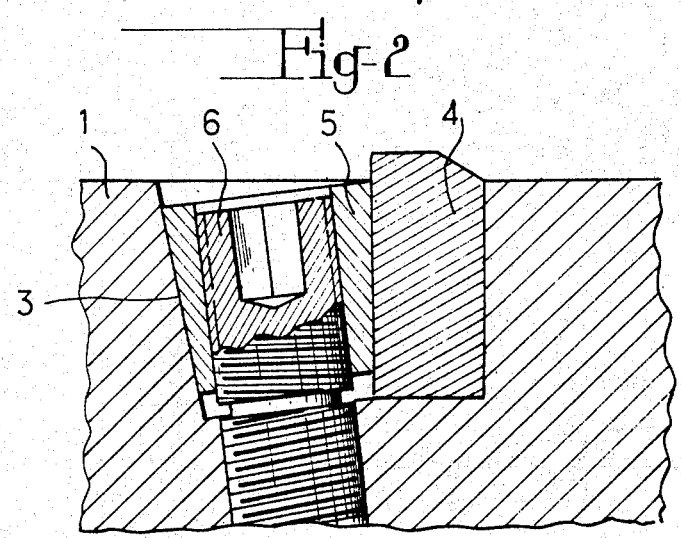
FIG. 2 is a cross-section through line II—II of FIG. 1.
Figure 3:
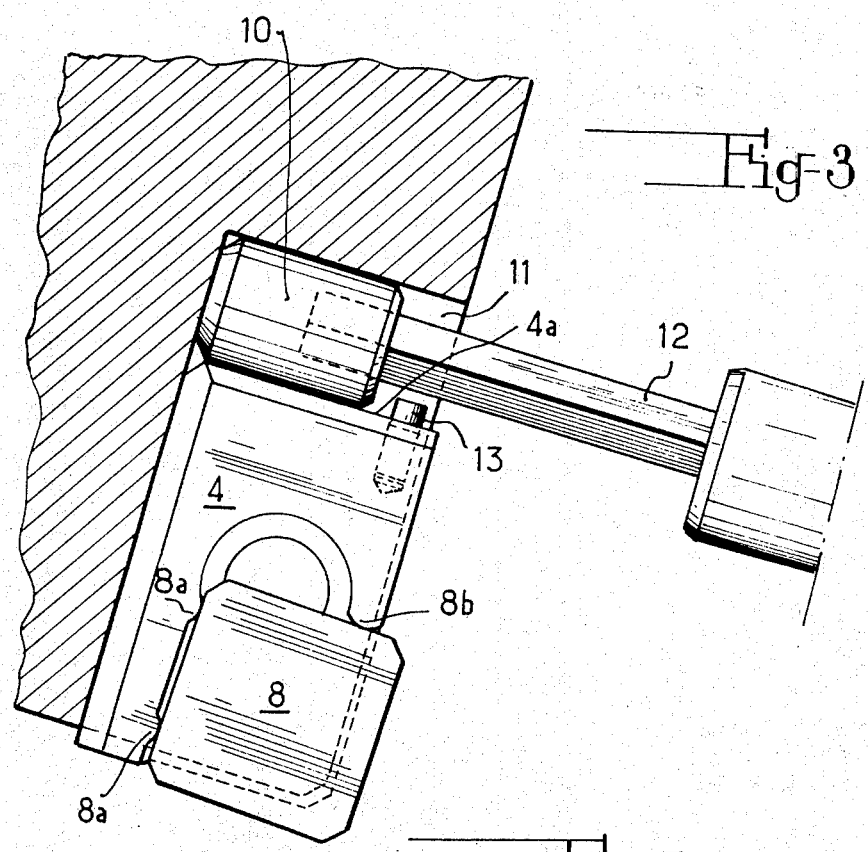
FIG. 3 is a cross-section through line III—III of FIG. 1.
Figure 4:
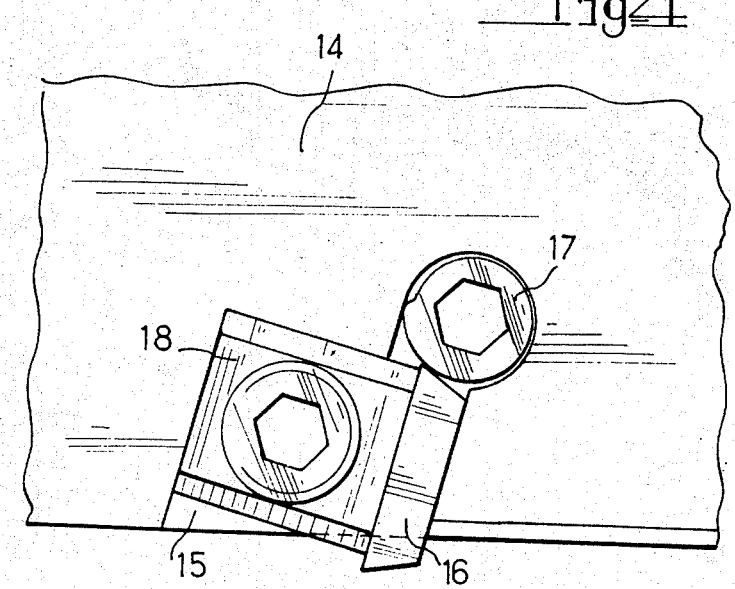
FIG. 4 is a view similar to FIG. 1 of the second embodiment.

Thus, as illustrated in FIG. 4, the cutter body 14 is provided with a recess 15 inside which the cutter body holds said blade fast. The adjustment of this cutter is performed exactly as in the case illustrated in FIGS. 1 to 3.

Obviously, my invention is not limited to the embodiments disclosed and it covers all the modifications thereof, falling in the scope of the accompanying claims.

What I claim is:

1. In a milling cutter comprising a body having at least one outward opening recess, said recess having an extension in said body, a cutting blade disposed in and projecting out of said recess, means in said recess clamping the blade fast between said clamping means and a side wall of the recess, and a hand-operable cam mounted for rotation in said extension and acting between said blade and a side wall of said extension to exert pressure on said blade; the improvement in which said cam has a rounded but noncircular cross section, said cam having line contact with said blade and with said extension wall along straight lines that are parallel to each other and to the axis of rotation of the cam and that are disposed on opposite sides of said axis, said lines being coextensive with each other, said cam along said lines having substantially constant cross sectional configuration.

2. A milling cutter as claimed in claim 1, in which said cam abuts directly against said blade.

3. A milling cutter as claimed in claim 1, and a support disposed in the recess and carrying the blade and against which the cam abuts directly, said means clamping the blade fast in said recess including means clamping the support fast in said recess and the blade fast in the support.

4. A milling cutter as claimed in claim 1, and a support in the recess carrying the blade and against which the cam abuts directly, and a stud carried by the support and extending across the outer end of the cam to hold the cam against outward shifting, said means clamping the blade fast in the recess including means clamping the support fast in the recess and the blade fast in the support.

* * * * *